Sept. 1, 1936. J. V. CAPUTO 2,052,964
WELDING MACHINE
Filed Nov. 11, 1931 3 Sheets-Sheet 2

INVENTOR
James V. Caputo
by his attorneys
Byrnes, Stebbins, Parmelee & Blenko

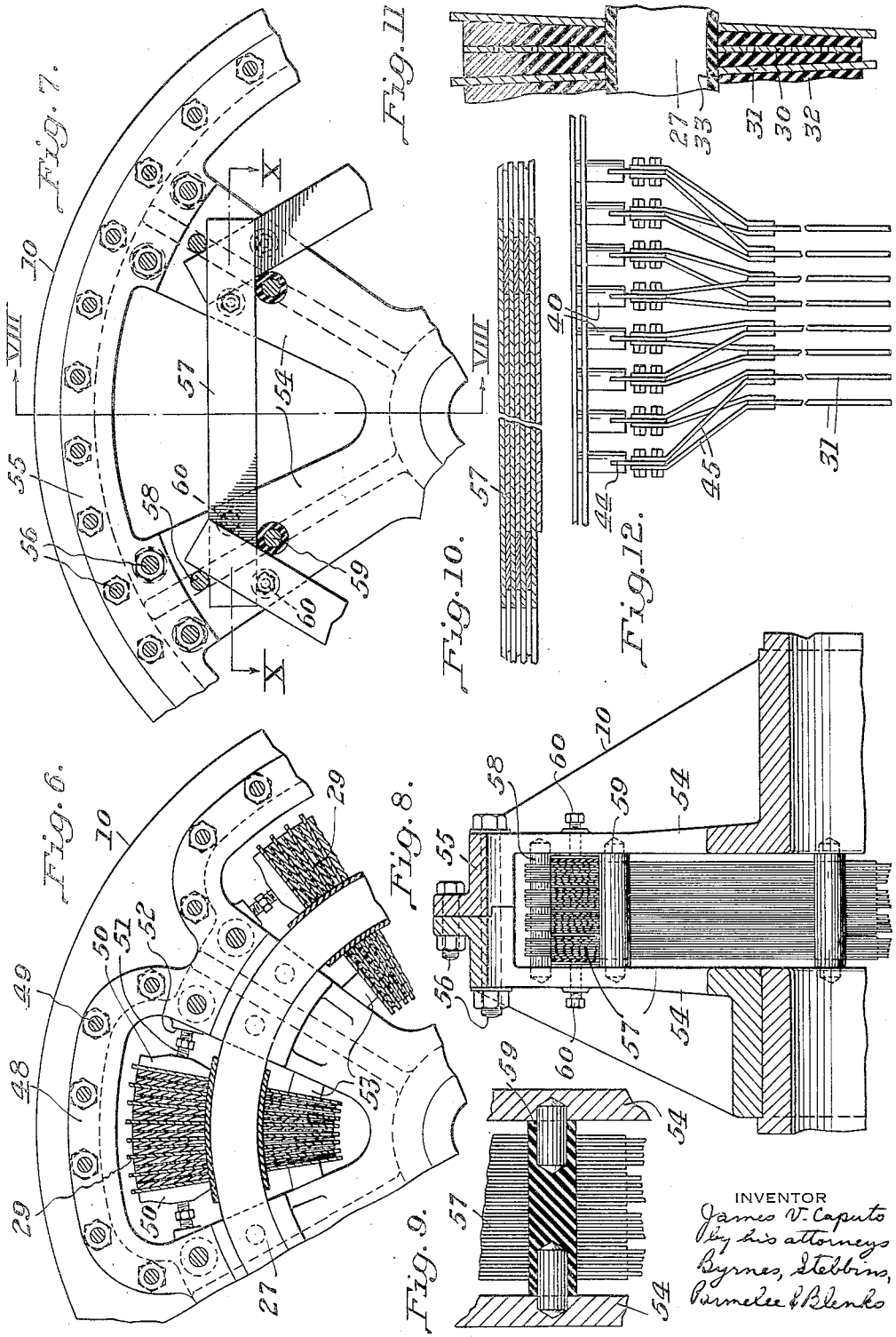

Patented Sept. 1, 1936

2,052,964

UNITED STATES PATENT OFFICE 2,052,964

WELDING MACHINE

James V. Caputo, Girard, Ohio

Application November 11, 1931, Serial No. 574,256

17 Claims. (Cl. 219—6)

My invention relates to apparatus for continuously welding metal lengths, such as formed tubes having an axial seam, by the electrical resistance method.

It has been proposed heretofore to provide an electric welding machine with a rotating transformer comprising an annular core having suitable primary and secondary windings thereon and means for rotatably supporting the entire structure. In all such proposals with which I am familiar, however, the construction of the apparatus involves such difficulties that machines of this type have rarely been used. In other words, rotating welding machines embodying transformers with annular cores have not heretofore been made practical. In one such machine with which I am familiar, the secondary circuit carrying the welding current is constituted partly by the shaft supporting the entire machine. Such an arrangement, obviously, requires expensive construction and also introduces the necessity of special cooling equipment. In addition, the massive members forming part of the secondary circuit give rise to large losses and the operation is therefore somewhat inefficient. The length of the secondary circuit introduces considerable resistance and other losses, such as those caused by eddy currents and skin effect, are experienced.

Another objection to rotating welding machines having annular transformer cores is the fact that none of the previous types were designed so as to permit ready access to the parts and removal in case of necessity for repair or replacement.

As has already been stated, the actual construction of previous types of machines has been attended with great difficulty since such machines were not designed with the practical requirements of electrical construction in mind. In one example, the primary winding is a continuous ribbon wound edgewise around an annular core and the secondary is formed by a shell completely enclosing the core and connected to a hollow shaft traversing the latter and also supporting the whole structure. A construction of this type is obviously not practical from either the mechanical or electrical standpoint.

I have invented a machine for continuously welding metal lengths, such as formed tubes having an axial seam, in which transformers having annular cores are mounted for rotation. According to a preferred embodiment of the invention, I mount a welding electrode, comprising a pair of annular members or discs arranged side by side and mechanically connected but insulated from each other, upon a supporting shaft. At each end of the shaft, projecting arms form a spider for supporting an annular core beside the electrode and in a plane parallel thereto. The shaft is supported on journals resting in suitable bearings, the journals being also provided with arms forming spiders which cooperate and are connected with those on the shaft. Between the projecting arms of the spider, the transformer cores are provided with alternate primary and secondary windings. These windings are preformed, that is, they are wound individually on forms and are then assembled with the transformer core. By arranging the windings in groups, it is possible to assemble the annular core after the windings have been positioned. In the completed device, no magnetic or conducting material traverses the annular cores so there are no losses due to eddy currents or hysteresis in any part of the device except the core.

The secondary windings on the transformer cores have short straight connections directly to points on the electrode adjacent the periphery thereof. The secondary windings on opposite sides of the electrode are connected to both insulated portions thereof by pins traversing the electrode and arranged in groups, one group being insulated from one electrode member and connected to the other, the other group being connected to said one electrode member and insulated from the second. This electrode construction is claimed broadly in my application Serial No. 475,174, filed August 14, 1930, for Electric welding machine. I also employ equalizing connections comprising conducting discs connected alternately with said groups of pins for providing parallel paths for the welding current between the secondary windings at different points in the periphery of the core and the point of contact between the electrode and the article being welded, as disclosed and claimed in my U. S. Patent No. 1,910,882 for Welding electrode. The primary and secondary windings are braced from the supporting members to prevent dislocation thereof.

The entire machine is supported in suitable bearings for rotation and may be driven by means disclosed in my first mentioned copending application, Serial No. 475,174. As shown in said application, I prefer to mount the rotating structure so that it can be vertically adjusted.

While in the preferred form of the invention I employ a transformer core of circular outline, it is also possible, by a modification, to employ a hexagonal core and thus avoid the necessity for providing arcuate core punchings. Rectangular strips can be employed instead with a resulting economy in construction. According to another modification of the invention, the arms projecting from the spiders may be connected by yokes or continuous rims to reinforce the entire structure.

For a thorough understanding of the invention, reference is made to the accompanying drawings illustrating the present preferred embodiment thereof with certain modifications. In the drawings:—

Figure 6 is a view similar to Figure 2 showing a slightly modified form of construction;

Figure 7 is another view similar to Figure 2 showing a still further modified form;

Figure 8 is a sectional view taken on the line VIII—VIII of Figure 7;

Figure 9 is a partial view similar to Figure 8 showing in section portions appearing in elevation in Figure 8;

Figure 10 is a sectional view along the line X—X to enlarged scale;

Figure 11 is a partial sectional view similar to a portion of Figure 2 or 6 to an enlarged scale; and Figure 12 is a partial view looking down on the connections between one group of transformer secondary windings and the electrode.

Figure 13 is a partial sectional view along the line XIII—XIII of Figure 1, certain portions being omitted for clearness.

Figure 1:
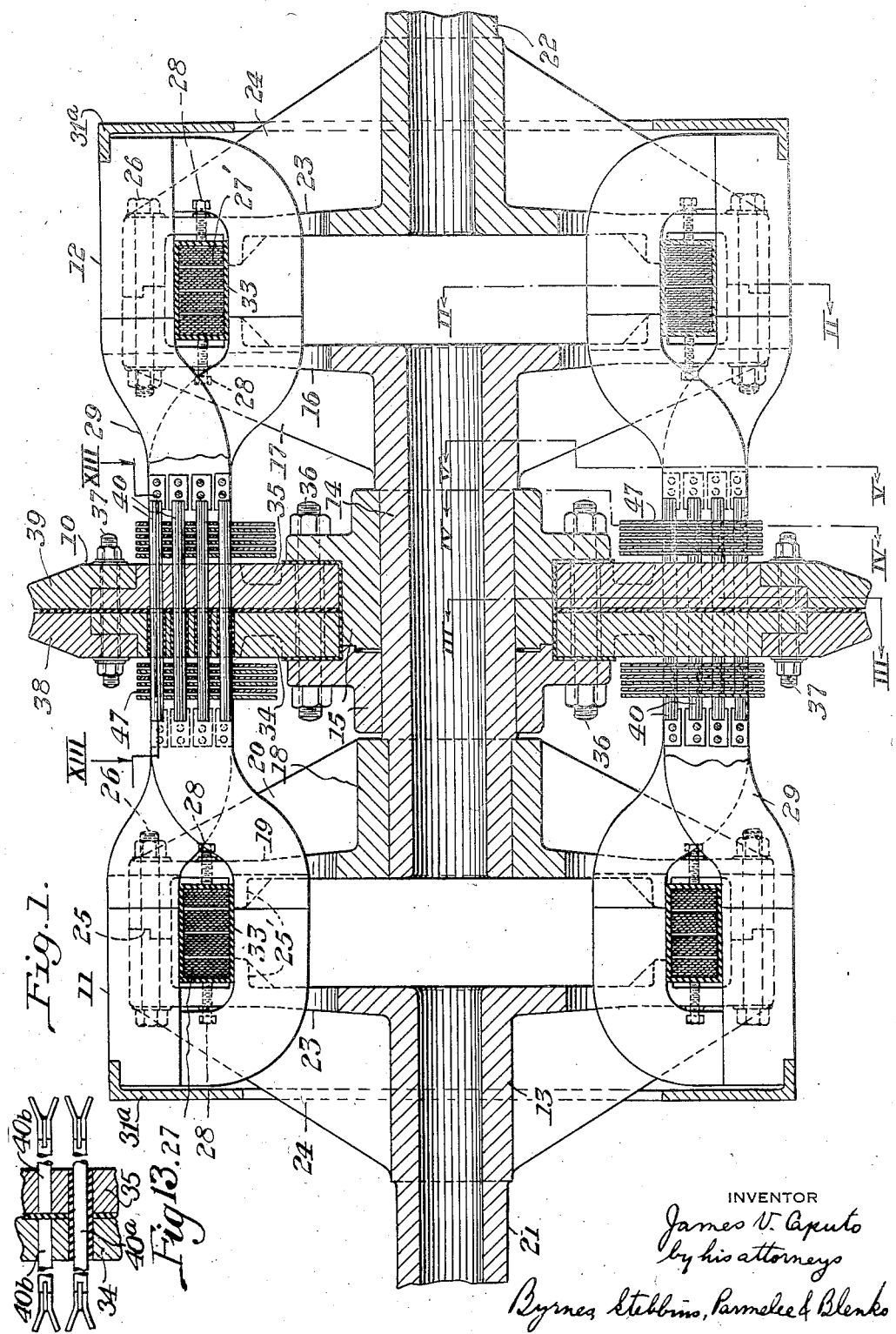
Figure 1 is a sectional view of the apparatus taken through the axis of the rotating system, omitting certain features for the sake of clearness.

Referring in detail to the drawings, the welding machine of my invention preferably comprises an electrode 10, transformers 11 and 12 disposed laterally thereof, and a supporting structure indicated generally at 13 for providing a rotatable mounting for the electrode and transformers. The supporting structure 13 includes a shaft 14 on which the electrode 10 is directly mounted by means of clamping collars 15 keyed thereto. At one end, the shaft 14 is provided with radial arms 16 having reinforcing ribs 17. The other end of the shaft 14 is adapted to receive a collar 18 provided with radial arms 19 reinforced by ribs 20 similar to the arms and ribs 16 and 17. The collar 18 is pressed on the shaft 14 and may also be keyed.

The shaft 14 and the structure carried thereby are supported on journals 21 and 22. The journals are simply short shaft sections having a portion machined for fitting in a bearing, and radial arms 23 reinforced by ribs 24. The ends of the arms 16 and 19 on the shaft 14 and the arms 23 on the journals are machined at 25 so that they may be readily fitted together and secured in the illustrated relation by bolts 26. The bearings for the journals 21 and 22 (not shown) are preferably mounted for vertical adjustment, as disclosed and claimed in my copending application Serial No. 475,174.

The radial arms 16, 19 and 23 constitute symmetrically disposed spiders and are provided with laterally extending lugs 25' adjacent their outer ends. Between the spiders formed by the symmetrical aligned radial arms, annular transformer cores 27 and 27' are positioned. The location of the cores relative to the spiders may be adjusted by means of screws 28. These screws also serve to clamp the core laminations together, and to position the core rigidly.

Between adjacent arms of the spider, I position groups of primary and secondary transformer windings 29, the primary windings being indicated at 30 and the secondary windings at 31. Insulation 32 separates the windings from each other and an insulating sleeve 33 on the core separates the windings therefrom, as shown more clearly in Figure 11. The primary windings of each group 29 are preferably connected in series by jumper connections preferably joining adjacent primary windings within the space between the spiders. All the primary windings associated with both transformer cores are preferably connected in series by conductors which may traverse the bore of the shaft and journals. One of the journals is provided with slip rings through which high voltage alternating current may be supplied to the primary windings of the transformer from an external source.

Each primary winding 30 comprises several turns of copper strip on edge, each turn being insulated in the usual manner and the terminals brought out as before mentioned for purposes of interconnection. The secondary windings 31 are preferably formed from two pieces of copper strap of the shape illustrated in Figure 1. The two pieces constituting the one-turn secondary windings are brazed together. The secondary windings are all connected in parallel to the electrode 10, alternate terminals of the ends being connected to opposite sides of the electrode in a manner to be described more fully hereafter. In illustrating the primary and secondary transformer windings as in Figure 2, no attempt has been made to illustrate the details of the insulation or any connections, since these are well known. The drawings indicate merely the schematic relation of the various parts. Conducting rings 31a engage the secondary windings at points of equal potential and serve as a mechanical reinforcement therefor and as an equalizing connection.

It will be apparent that, by reason of this construction, the primary and secondary windings are sandwiched throughout their entire peripheries. Previous constructions have been characterized by partial sandwiching of the alternate primary and secondary windings.

The electrode 10 comprises a pair of annular conducting members 34 and 35 placed side by side and separated by insulation. Insulated throughbolts 36 and 37 connect the two members of the electrode and the latter also serve to secure to the annular members, removable rims 38 and 39 which are in electrical contact, respectively, with the members 34 and 35 but are insulated from each other. The periphery of the rims is grooved for cooperation with the edges of an axial seam in a formed tube, although the rims may be shaped otherwise when welding material of a different character.

Figure 2:
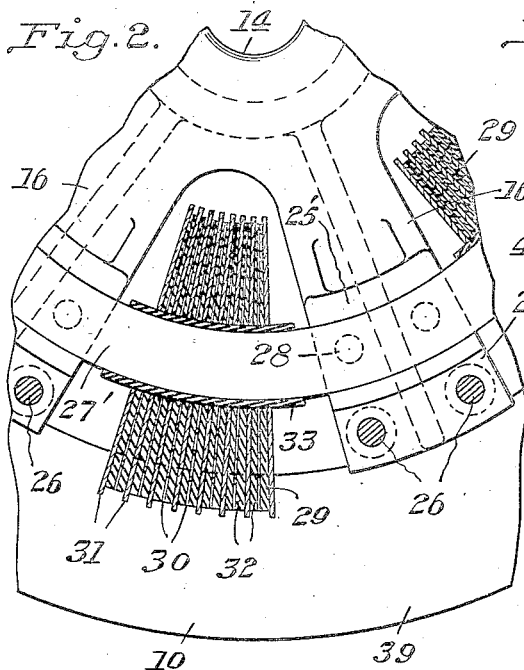
Figure 2 is a partial sectional view along the line II—II of Figure 1.
Figure 3:
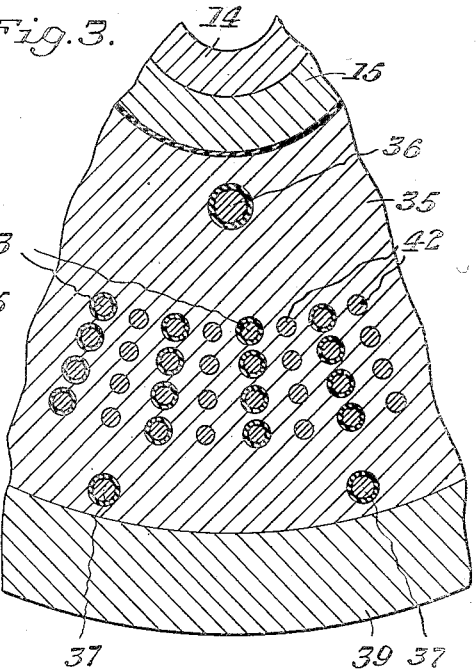
Figure 3 is a partial sectional view along the line III—III of Figure 1.
Figure 4:
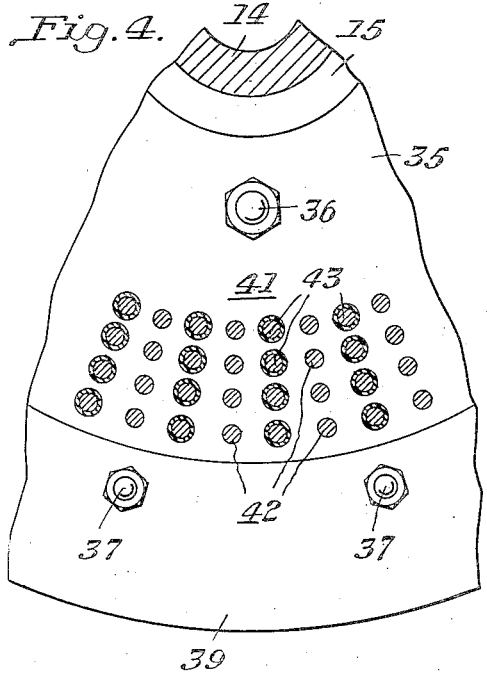
Figure 4 is a partial sectional view along the line IV—IV of Figure 1.
Figure 5:
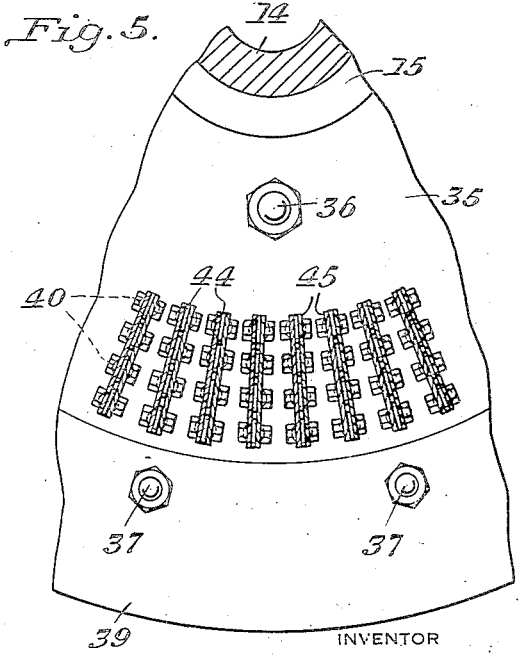
Figure 5 is a similar view along the line V—V of Figure 1.

Cross connection pins 40 extend through the electrode members adjacent their periphery and are arranged in groups 41 corresponding to the groups 29 of the transformer windings. The pins in each group, furthermore, are subdivided into two sets in alternating rows, as indicated in Figures 3 and 4 at 42 and 43. The pins of one set, for example 42, have electrical contact with one of the electrode members 35, as shown in Figure 1, but are insulated from the member 34 through which they also pass. The pins of the sets 43 are oppositely arranged. They pass through the member 34 without insulation therefrom but in electrical contact therewith. They are separated from the member 35 in passing therethrough by insulation.

It will be apparent from the foregoing that the alternate sets of connection pins provide means for connecting transformer terminals of both polarities to the proper electrode member 34 or 35. The ends of all the pins are slotted and all the pins in each set are connected by straps 44 brazed in the end slots, as shown at Figure 12. Short connecting straps 45 extend from the straps 44 to corresponding terminals of two adjacent secondary windings. Each connection 45 connects similar terminals of the two adjacent primary windings to one of the groups 42 or 43. The next adjacent strap 45 connects the other terminals of the two adjacent secondary windings to the appropriate set of pins 43 or 42, and so on. The straps 45 may be secured to the straps 44 by bolts and may be brazed or bolted to the ends of the transformer windings.

Alined secondary turns on opposite sides of the winding may be connected in series instead of in parallel if a higher welding voltage is desired. This arrangement is shown in Figure 12. As there shown two terminals of alined windings, of unlike polarity are connected together by a pin 40a insulated from both electrode members. The other terminals of the windings are connected to the electrode members respectively by short pins 40b extending thereinto and in conducting relation with one member only. Alined windings are thus connected in series while all the groups of alined windings so connected are in parallel.

Interconnecting discs 47 have contact with and are insulated from alternate sets of the pins 40 and provide a plurality of interleaved parallel paths for the welding current from the different portions on the periphery of the rotating structure to the point of weld, as disclosed and claimed in my U. S. Patent No. 1,910,882, above mentioned.

In a modified form of construction illustrated in Figure 6, adjacent spider arms are connected by a continuous yoke 48 and the yokes associated with opposed spiders may be secured together by additional bolts 49. Figure 6 also illustrates how the primary and secondary windings of each group between spider arms may be braced from the latter. Bracing blocks 50 engage the outer secondary winding in each group and a combined right and left hand screw jack 51 engaging a boss 52 on the spider arm serves to force the block 50 firmly against the windings. Within the periphery of the core, the windings may be supported by wedging blocks 53 in the same manner.

Figure 7 illustrates a further modified form of spider construction, as well as a slightly different type of transformer core. As shown in Figure 7, the spiders have arms 54 connected by a continuous rim 55. Both the rims and arms of opposite spiders may be secured together by bolts 56. The transformer core indicated at 57 in Figure 7, instead of being circular in outline as are cores 26 and 27, is rectilinear, in this case, hexagonal, and consists of straight lengths of core rather than arcuate punchings. The laminations forming the core are laid up to form a combination lap and butt joint at the intersections of the rectilinear portions of the core. The manner of laying up the laminations is shown more clearly in Figures 8, 9 and 10. Pins 58 extending across the space between adjacent spiders cooperate with pins 59 and adjusting screws 60 similar to those shown at 28 for positioning the core between the spider. The pin 59 cannot be of continuous metallic material but must be of insulation, as shown in Figure 9, to prevent the establishment of a closed metallic circuit linking the transformer, which would, of course, serve as a short-circuited secondary winding.

When using a rectilinear core, the windings will be parallel to each other instead of at an angle, and the connecting pins will be rectangularly arranged instead of radially, as with the circular core.

It will be apparent from the foregoing description that the welding apparatus described and illustrated herein is characterized by numerous advantages over previous structures of this general type. In the first place, the apparatus is designed with a view to simplifying the mechanical and electrical construction. The erection and assembly of a machine is facilitated by the construction employed. The grouping of the transformer windings permits the core to be assembled or built up through the latter after they have been first placed in position. This operation may be further simplified by collecting all the groups of windings as close together as possible and then building up the core through the assembled windings. After the core has been completed, the windings may be placed in proper position and the core and windings mounted between the spiders. The cross connections between transformer windings on opposite sides of the electrode are very simple and yet they permit the connection of all the secondary windings in parallel or series parallel to supply current to the electrode. The connections between the secondaries and the electrode are short and the circuit does not include the supporting shaft or journals. Current is supplied close to the point of use, that is, the periphery of the electrode. The equalizing connections provide direct low resistance paths from all points on the periphery of the rotary structure to the point of tangency with the material being welded. The entire transformer units can be removed easily for inspection or replacement because the supporting structure is designed for easy disconnection. The transformer windings are interleaved completely to reduce reactance and losses.

Because of the high efficiency of the machine disclosed and the reduction in losses as compared to previous machines of this type, I am able to dispense with water-cooling of the various conducting portions. Since the losses represent only waste energy and undesired heat, by eliminating them, it is possible to rely on natural radiation for cooling the transformer windings and electrode, although air blast cooling may be provided if desired. The metallic supporting structure for the annular transformer cores does not traverse the cores but envelops them externally so that there is no linkage with the transformer core except that of the secondary windings. The energy loss resulting from such linkages, which have been used in former constructions, is also avoided. By providing transformer windings in groups, it is possible to use preformed windings. The former machines required the windings to be wound by hand after a core had been assembled, with a great increase in cost over my arrangement. Increased capacity of the unit may easily be obtained by using more windings for which ample space is available between the arms of the spiders. No previous welding machines using an annular rotating core provide for rigidly supporting the core. According to my invention the annular core is firmly secured to the shaft at spaced points and rigidly supported all around.

Although I have illustrated and described but a single preferred embodiment of the invention described herein, together with certain modifications and portions thereof, it will be understood that any changes in the construction illustrated may be resorted to without departing from the spirit of the invention as set forth in the appended claims.

I claim:

1. In a welding apparatus, the combination with a shaft and a welding electrode carried thereon comprising a pair of annular members secured together in insulating relation, of arms extending from said shaft for supporting an annular transformer core in a plane parallel to that of the electrode, and a journal for supporting one end of said shaft having arms secured to those on said shaft.

2. A welding apparatus comprising a shaft, an annular welding electrode carried thereon, arms extending radially from one end of the shaft, a journal for said end of the shaft having arms secured to the shaft arms, and an annular transformer core supported by said arms.

3. A rotatable welding unit comprising a shaft, a welding electrode thereon, arms projecting radially of the shaft for supporting an annular transformer core thereon, and preformed windings on said core for supplying welding current to the electrode adjacent the periphery thereof.

4. A rotatable welding unit including a shaft, an electrode secured thereon, arms radiating from the shaft adjacent the electrode for supporting an annular core, and a journal for one end of the shaft having arms secured to the arms on the shaft, the arms on the shaft and journal being connected by continuous rims.

5. A rotatable welding unit comprising a shaft, a welding electrode thereon, arms projecting radially of the shaft for supporting an annular transformer core thereon, preformed windings on said core for supplying welding current to the electrode adjacent the periphery thereof, and bracing means engaging said arms for supporting said windings laterally.

6. In a rotatable welding apparatus, a shaft, a transformer having a core disposed axially of the shaft, and radial supporting means on the shaft embracing the core externally only.

7. Welding apparatus comprising a shaft, a journal spaced from the shaft, an annular core therebetween coaxial therewith, and spiders on the journal and shaft connected beyond the circumference of the core for supporting the latter and rigidly joining the journal to the shaft.

8. In a welding transformer, the combination with a shaft, an annular core surrounding the shaft, radial supporting means on the shaft engaging the core at spaced points, and preformed windings assembled on said core in groups between the points of engagement therewith of said means.

9. In a welding transformer, a rotatable annular core, and primary and secondary windings on said core in groups, the groups being spaced whereby core laminations may be inserted in the windings of each group from the exterior thereof.

10. In a welding transformer, an annular core, rotatable supporting means therefor, and preformed primary and secondary windings spaced thereabout and slidable thereon, whereby the core may be partially exposed by moving the windings close together.

11. In a welder, the combination with a shaft supported for rotation having means extending radially thereof, of an annular transformer core supported on said means, said core being composed of stacked laminations with straight edges only, the core having a polygonal outline, and intermingled primary and secondary windings disposed in groups on said core.

12. In a welding apparatus, a rotatable electrode including a pair of discs arranged side by side but insulated from each other, transformers on opposite sides of the electrode having primary and secondary windings, and connections between the secondary windings and the electrode comprising a conducting member extending through and insulated from the electrode, and separate conducting members each having electrical conducting engagement with only one of said discs, terminals of secondary windings on opposite sides of the electrode of different instantaneous polarity being connected to said first-mentioned conducting member, and the remaining terminals of said windings being connected respectively to said second-mentioned conducting members.

13. A welder comprising a shaft, radial arms adjacent the ends thereof, an annular electrode on the shaft, separate journals for supporting the shaft having arms secured to those on the shaft, annular transformer cores supported by the arms at the end of the shaft, windings on said cores, and connections to the periphery of both sides of the electrode from the windings on opposite sides thereof.

14. In a welder, the combination with a rotatable shaft, of an annular core and means on said shaft for supporting the core coaxially thereof, said means comprising metallic members grounded to the shaft and engaging the core directly.

15. In a welder, a rotary contact electrode, a transformer having an annular core, said transformer having windings connected to said electrode, means for rotatably supporting the electrode, and means extending radially of the electrode-supporting means and externally of the core, to support the core for rotation with the electrode and prevent linkage of the flux traversing the core by said core-supporting means.

16. In a welder, a rotary contact electrode, a transformer having an annular core disposed beside the electrode, means for rotatably supporting the electrode, and means extending radially of the electrode-supporting means and outwardly around the core to support it for rotation with the electrode, and prevent the induction of current which would flow in any conducting member extending through and around said core so as to link the flux therein.

17. The combination with a rotary electrode, a transformer having an annular core disposed thereadjacent, and means extending around said core but not therethrough, for supporting it for rotation with said electrode.

JAMES V. CAPUTO.